March 31, 1970  H. E. ELLER ET AL  3,504,275
FLUID BRIDGE METHOD AND MEANS OF DETECTING GASES HAVING
MAGNETIC SUSCEPTIBILITY
Filed Jan. 9, 1968
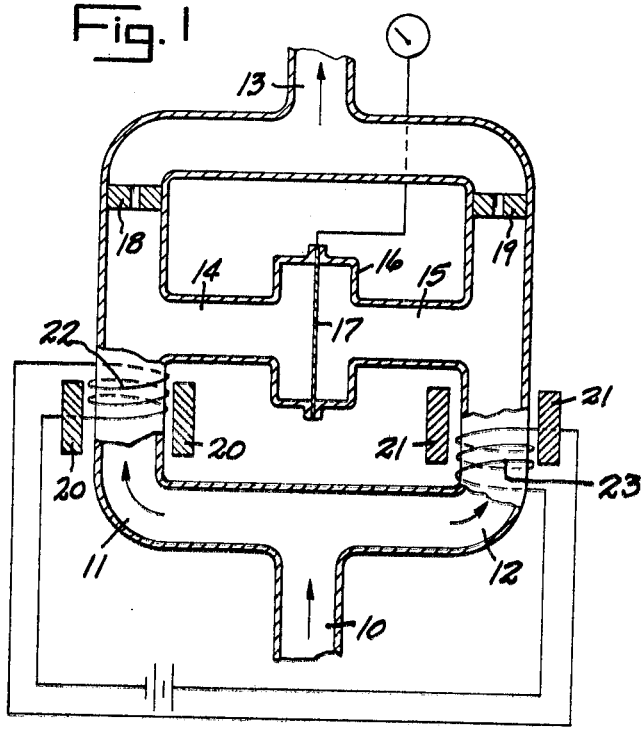
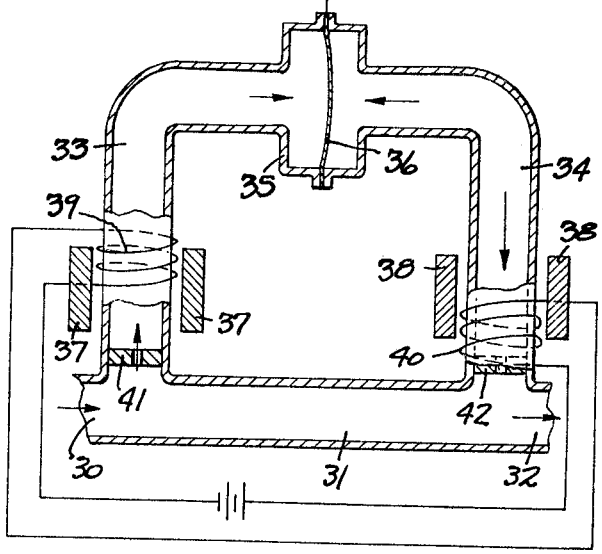
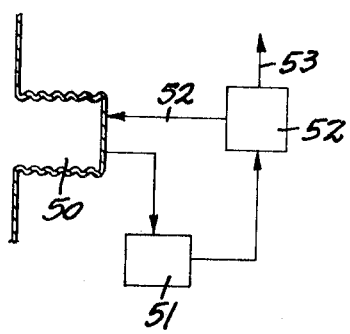
INVENTORS
HAROLD E. ELLER &
HUBERT DRECKMANN
BY
Eugene C. Knoblock
ATTORNEY

United States Patent Office 3,504,275
Patented Mar. 31, 1970

3,504,275
FLUID BRIDGE METHOD AND MEANS OF DETECTING GASES HAVING MAGNETIC SUSCEPTIBILITY
Harold E. Eller and Hubert Dreckmann, Michigan City, Ind., assignors to The Hays Corporation, Michigan City, Ind.
Filed Jan. 9, 1968, Ser. No. 696,569
Int. Cl. G01r 33/00; G01n 27/72
U.S. Cl. 324—36                                9 Claims

ABSTRACT OF THE DISCLOSURE

A method and means for detecting a gas having magnetic susceptibility wherein magnetic winds of the same magnitude but acting in opposite directions are generated by the conjoint action of magnets and heating means upon two similar streams of a sample gas so as to create a pressure difference in said streams which is detected by differential pressure sensing means.

---

This invention relates to improvements in method and means of detecting gases having magnetic susceptibility, such as oxygen.

Various types of devices have been developed heretofore to utilize the unique magnetic properties of oxygen and other gases having magnetic susceptibility in apparatus for determining the concentration of such a gas in a gas mixture. In one type of prior apparatus commonly referred to as a paramagnetic detector the apparatus measures either the force exerted by a magnetic field upon a volume of subject gas or the pressure exerted by a volume of subject gas attracted to a magnetic field. Examples of paramagnetic detectors are to be found in U.S. Patents 2,416,344; 2,666,893 and 3,026,472. The paramagnetic detectors have one substantial disadvantage in common in that they are affected by the diamagnetism of the background gases and must be compensated for such effects in order to achieve accurate results.

Another prior type of apparatus is known as an inductive detector. Apparatus of this character measures the magnetic permeability of a gas which is related to the magnetic susceptibility of the gas according to:

$$X = 1 + 4Y$$

where X equals permeability and Y equals susceptibility. Examples of inductive detectors are to be found in U.S. Patents 2,467,211; 2,930,970; 3,049,665 and 3,076,929. The inductive detectors of this type, like the paramagnetic detectors, are affected by the diamagnetism of the background gases.

Another type of detector utilizing the magnetic properties of a subject gas is known as a thermal magnetic detector. Thermal magnetic detectors measure pneumatic and/or thermal effects caused by a so-called magnetic wind generated therein and proportional to the gas of magnetic susceptibility. Examples of thermal magnetic detectors are to be found in U.S. Patents 2,603,964; 2,763,151; 2,815,659 and 3,045,474. Most thermal magnetic detectors are not affected by the diamagnetism of the background gases, but they are affected to varying degrees by other physical parameters of background gases, such as the thermal conductivity, the density, the viscosity or the heat capacity of the background gases, or combinations of such parameters. One special type of thermal magnetic detector, shown in German Patent No. 1,181,945 and French Patent No. 1,336,252, is affected by physical parameters such as thermal conductivity, density, viscosity and heat capacity of the gas to only a slight extent, but is affected by the diamagnetism of the background gases.

Another type of prior apparatus may be referred to as a divided path differential pressure detector. Such an apparatus is shown in U.S. Patent No. 3,191,425 and requires the use of moving or rotatable magnets and other structural characteristics which render them complicated and expensive.

It is the primary object of this invention to provide a simple and inexpensive oxygen detector which requires a minimum number of parts to produce highly accurate results which are substantially free from the effects of the properties and parameters of background gases.

A further object is to provide a method of this character wherein two similar streams of a sample gas being measured are directed from a source of said gas through similar paths to a differential pressure detector of high sensitivity and past magnets and heating means which generate in each a magnetic wind of the same magnitude but acting in opposite directions so that one enhances the gas flow from an inlet to an outlet and the other retards gas flow from the inlet to the outlet, thereby generating a pressure differential measurable by said differential pressure detector.

A further object is to provide a device of this character wherein a differential pressure between two separate gas flows of a sample gas is generated as a function of the percentage of a gas of magnetic susceptibility and independent of the characteristics of the background gases.

Other objects will be apparent from the following specification.

In the drawing:

FIG. 1 is a schematic view of apparatus constituting one embodiment of this invention.

FIG. 2 is a schematic view of apparatus constituting another embodiment of this invention.

FIG. 3 is a schematic view of another type of detector usable with the apparatus of FIGS. 1 and 2 and which is of the force balanced type.

In this invention two streams of a sample gas are directed through passages of similar size and shape having similarly positioned therein means for generating in each a magnetic wind of the same magnitude but acting in opposite directions so as to create a pressure differential which can be measured by a detector, such as a linear differential pressure detector or a force balanced detector.

In the embodiment of the invention illustrated in FIG. 1, apparatus having an inlet 10 is connected with a source of a sample gas containing a component gas of magnetic susceptibility which is to be measured. A pair of similar passages 11 and 12 branch from the inlet 10, said branch passages being similar in length, cross section and shape and of the same material, such as glass or stainless steel. The branch passages 12 converge at an outlet 13. Intermediate the length of the branch passage 11 is a lateral passage 14 and a similar lateral passage 15 is located intermediate the length of the branch passage 12. The passages 14 and 15 communicate with opposite portions of the chamber 16 of a linear differential pressure detector of high sensitivity, such as one having a differential pressure responsive element 17 such as a diaphragm or a bellows. Each of the passages 11 and 12 has a flow restrictor therein. The flow restrictors 18 and 19 may be orifice plates or venturis, and are of the same size and are positioned in the passages in the same relation, i.e. in the portions of the branch passages 11 and 12 between the laterally extending passages 14 and 15 and the outlet 13.

Within each passage 11 and 12 between the inlet 10 and the respective lateral passages 14 and 15 is positioned means for generating a magnetic wind. Each magnetic wind generator includes a magnet which may be a permanent magnet or an electromagnet energized by direct current. The magnet 20 has its pole pieces positioned to generate a field of magnetic flux in the passage 11 and the magnet 21 has its pole pieces positioned to generate an equal field of magnetic flux in the passage 12. An electric heater winding 22 is positioned to heat gas flowing in the passage 11 and through said field of magnetic flux, said heater being offset lengthwise of the passage from the magnet 20 in such a direction that the magnetic wind generated by the conjoint action of the magnet 20 and the heater winding 22 acts to create a magnetic wind in the direction of the outlet. The similar heater winding 23 is provided to heat the gas in the passage 12 passing through the field of magnetic flux but is displaced from or projects lengthwise of the passage from the magnet 21 in such direction as to create a magnetic wind of the same magnitude as that created in passage 11 but acting in opposite direction, i.e. toward the inlet, so as to retard the flow of gas through passage 12 toward the outlet 13. The windings 22 and 23 may be located either within the respective passages or around the passages.

The resultant of the conjoint but opposite actions of the magnetic wind generators in the two passages 11 and 12 is a pressure differential which is transmitted through the lateral passages 14 and 15 to the differential pressure detector 16 to shift the pressure sensing diaphragm or bellows 17 thereof. The detector 16 may include a suitable indicator or recorder (not shown) which is calibrated to designate the percentage or quantity of the gas of magnetic susceptibility which is contained within the gas sample.

Another embodiment of the invention is illustrated in FIG. 2 wherein a sample gas is supplied at the inlet 30 of a passage 31 extending to an outlet 32. A measuring branch passage 33 communicates with passage 31 and a second measuring branch 34 communicates with passage 31 spaced from passage 33. The measuring branch passages 33 and 34 are of the same length, cross sectional size and shape and are formed of the same materials, such as stainless steel or glass. The measuring branch passages 33 and 34 are connected in opposed relation to the housing or chamber of a linear differential pressure detector of high sensitivity having a pressure sensitive element 36, such as a diaphragm or bellows.

Means for generating similar magnetic winds in the two measuring branch passages 33 and 34 are similarly located and arranged with respect to said measuring branch passages. Thus a magnet 37 has its pole pieces positioned to create a magnetic flux field at a selected part of the passage 33 and a similar magnet 38 has its pole pieces positioned similarly with reference to passage 34. A heater winding 39 serves to heat the sample gas flowing in passage 33 through the magnetic flux field, said heater winding being so oriented with reference to the permanent magnet 37, as by longitudinal offset therefrom in the direction of the detector housing 35, as to generate a magnetic wind acting toward the detector 35. A similar heater winding 40 acts upon the gas in passage 34 and cooperates with magnet 38 to generate a magnetic wind of the same magnitude as that in passage 33 but acting in a direction toward the passage 31 so as to retard the flow of gas through the passage 34 to the detector 35. Flow restrictors 41 and 42 may be located in passages 33 and 34 between conduit 31 and the magnetic wind generators.

The pressure differential in the passages 33 and 34 caused by the magnetic wind generators is measured by the detector 35 at the pressure sensitive element 36. The detector 35 is suitably calibrated to designate the concentration in the sample gas of the gas component of magnetic susceptibility.

In both of the apparatus shown in FIGS. 1 and 2, the pressure differentials caused by the oppositely acting magnetic winds act independently of the composition of the sample gas or background gas. In other words, the pressure differentials and the resultant operation of the detector are not affected by the physical properties of the background gases such as their thermal conductivity, density, viscosity, heat capacity, or diamagnetism.

The arrangement of the magnetic wind generating systems 21, 23 and 20, 22 in opposed relation in different branch passages of the flow path in this device serves the following functions: (a) it cancels the diamagnetic effects of the sample gas; (b) it cancels chimney effects in the system; and (c) it doubles the magnetic wind effect.

In each of the forms of apparatus shown in FIGS. 1 and 2 there has been illustrated the use of a linear differential pressure detector of high sensitivity. It is not essential, however, that such a detector be employed, and instead, each apparatus may employ a force balanced detector of the character shown in FIG. 3 in which the numeral 50 designates the pressure sensing element of a differential pressure detector, which element may be a bellows. Suitably connected to the pressure sensing element 50 to be actuaetd thereby is a transducer 51 capable of converting the motion of the pressure sensing element 50 into an electrical signal. The electrical output of the transducer 51 is suitably amplified and supplied to an electrically energized force balance unit 52 or servo unit. The force balance unit 52 exerts a force upon the pressure sensing element 50 tending to restore the pressure sensing element to a null or balanced position. The force balance unit 52 may include an indicator 53 which can be suitably calibrated in terms of the percentage of gas of magnetic susceptibility existing in the sample gas.

In the functioning of the detector shown in FIG. 3, a displacement of the pressure sensing element 50 from a null or zero position is sensed by and operates the transducer 51. The operation of the transducer activates the force balance unit 52 to restore the pressure sensing element to null position. The force exerted by the force balance unit is a measure of the differential pressure acting upon the pressure sensitive element 50 and is indicated by the indicator 53.

The use of a force balanced pressure detector as illustrated in FIG. 3 in apparatus of the character shown in FIGS. 1 and 2 has two advantages over the use of a linear differential pressure detector. The first advantage is that a force balanced pressure detector has an inherent high sensitivity as is characteristic of null balanced systems, and the second advantage is that the force balanced pressure detector eliminates linearity requirements for the pressure sensor.

While the preferred embodiments of the invention have been illustrated and described, it will be understood that modifications of the apparatus and the method embodying this invention may be made without departing from the spirit of the invention.

I claim:
1. The method of gas detection consisting of the steps of
    directing flow of a sample gas from a source through two similar passages,
    generating at a predetermined point in one passage by the use of a magnet and a heater, a magnetic wind acting in the direction of flow of gas in said passage from said source,
    generating in the other passage at a point similar to the generating point in the first passage and by the use of a magnet and a heater, a magnetic wind of the same magnitude as said first magnetic wind and acting in a direction counter to the direction of flow of gas in said passage from said source, and
    detecting the difference in pressure in said flow passages.

2. The method of gas detection defined in claim 1, wherein
    gas in said passages is discharged at an outlet after restriction to a predetermined extent in each passage, and the pressure difference of gases is detected at points between said generating point and said restriction point in each passage.

3. The method of gas detection defined in claim 1, wherein
said passages branch from a sample gas passage at spaced points and contain similar flow restrictors, and
said pressure difference detection occurs at a junction between said similar passages.

4. The method of gas detection defined in claim 1, wherein
the detecting of said pressure difference includes converting the pressure difference into motion of an element from a balance position, transducing the motion of said element into an electrical signal, and transducing said electrical signal into a force applied to rebalance said element.

5. Means for detecting in a sample gas a gas having magnetic susceptibility, comprising
means defining two similar gas flow passages communicating with a source of sample gas,
means for generating a magnetic wind in one flow passage acting in a direction away from said source,
means for generating in the other flow passage a magnetic wind of the same magnitude as said first magnetic wind and acting in a direction toward said source,
each magnetic wind generating means including a magnet and a heater winding adjacent said magnet, and
means connected to said passages to detect the difference in pressure produced therein by said wind generating means.

6. Gas detecting means as defined in claim 5, wherein each gas flow passage discharges at an outlet and contains a flow restrictor separating said outlet from said wind generating means and pressure detecting means.

7. Gas detecting means as defined in claim 5, wherein said gas source constitutes a conduit from longitudinally spaced points of which branch said flow passages.

8. Gas detecting means as defined in claim 5, wherein said pressure detecting means includes a member movable from a balance position in response to a pressure difference, a transducer responsive to movement of said member to generate an electrical signal, and a member responsive to the signal generated by said transducer and operative to restore said movable member to balance position.

9. Gas detecting means as defined in claim 5, wherein said pressure detecting means is of the null balancing type.

References Cited

UNITED STATES PATENTS

| | | | |
|---|---|---|---|
| 3,020,764 | 2/1962 | Joline | 73—407 X |
| 3,240,051 | 3/1966 | Lenfant | 324—36 XR |
| 3,302,448 | 2/1967 | Mocker | 73—23 |

ALFRED E. SMITH, Primary Examiner

U.S. Cl. X.R.

73—23